UNITED STATES PATENT OFFICE.

SAMUEL WHYTE, OF REDHILL, ENGLAND, ASSIGNOR TO S. H. MORDEN & COMPANY LIMITED, OF LONDON, ENGLAND.

PROTECTIVE COMPOSITION FOR HEAT TREATMENT OF ARTICLES OF IRON, STEEL, AND THE LIKE.

1,366,305. Specification of Letters Patent. Patented Jan. 18, 1921.

No Drawing. Application filed February 6, 1920. Serial No. 356,668.

*To all whom it may concern:*

Be it known that I, SAMUEL WHYTE, a subject of the King of England, residing at Redhill, county of Surrey, England, have invented certain new and useful Improvements in Protective Compositions for Heat Treatment of Articles of Iron, Steel, and the like, of which the following is a specification.

This invention lies in improvements in or relating to the protection of articles of iron, steel and the like in the process of heat-treatment, such as case-hardening or tempering, and has for its object (*a*) to facilitate the limitation of the case-hardening effect to those parts alone which are required to be hardened, and to insure that adjacent parts required to remain soft are not affected by the carbonizing process, and (*b*) to prevent hardening or tempering at desired spots or regions in an article subjected to quenching.

The invention consists in an improved or modified composition, which, when applied to iron or steel parts, adheres to the metal at high temperatures and protects these parts. Thus in a case-hardening process the composition is applied to the parts which are to remain soft and effectively protects them from the carbonizing influences, while the unprotected parts are being acted on. In a quenching process the composition is applied to those parts in which hardening is to be prevented or minimized, so that on quenching, a retardation of the cooling effect is caused at these parts.

According to this invention a protective composition for use in protecting articles of iron, steel and the like in the process of heat-treatment, such as case-hardening or tempering, consists of fireclay, a soluble alkaline silicate and a fluxing agent or fusion mixture, such as an alkaline carbonate and/or an alkaline or alkaline-earth borate.

Thus, according to this invention there is employed as a protective composition in actual use a viscous liquid containing an aqueous solution and suspension of soluble alkaline silicate, powdered fireclay and a fluxing agent or fusion mixture, such as an alkaline carbonate and/or an alkaline or alkaline-earth borate.

The composition from which the aqueous solution and suspension is prepared consists, according to this invention, of powdered fireclay, soluble powdered sodium silicate, and a fusion mixture, such as fused borax, and an alkaline carbonate, with or without a small proportion of plaster of Paris to assist setting.

The invention also consists in an anti-carbonizing or like compound including soluble powdered sodium silicate.

The invention also consists in an anti-carbonizing or like compound including a small proportion of an alkaline borate and carbonate.

The invention also consists in the improved anti-carbonizing or like compounds hereinafter described.

The invention further consists in methods of preparation of the composition.

In carrying this invention into effect in one form by way of example, the anti-carbonizing or like compound is composed of fireclay and sodium silicate together with agents such as borax and sodium carbonate, and is preferably of the following approximate composition:—

| | |
|---|---|
| Fireclay | 63% |
| Sodium silicate powder | 25% |
| Fused borax | 6% |
| Sodium carbonate | 6% |

The sodium silicate powder is prepared by evaporating sodium silicate solution to dryness, *e. g.*, on iron trays at about 300° C., and then grinding the dried product.

In place of using the ordinary liquid sodium silicate (water glass) and reducing it to dryness, if desired a soluble silicate powder may be employed which may contain alkaline sodium silicate or neutral sodium silicate, or both.

The various components, all in powder form, are mixed together and are in a convenient form for storing or transport.

When it is desired to use the composition, three parts by weight of this mixture are boiled with three parts by weight of water. When a skin forms on the surface one part more of the mixture is added and the whole boiled until it becomes of a consistency like paint. For case-hardening small parts like bolts, etc., which require their threads protected, the thread portions are coated conveniently by dipping in the paint-like composition. For larger work, such as cam shafts, etc., the compound is conveniently applied to the required portions by means of a brush. The parts themselves should be warmed to a temperature not exceeding 70° C. before applying the composition. Two coats should be applied in this way, but the first should be practically dry before the second is applied. Final drying should be done gradually, and preferably at a temperature below 100° C. When the compound has set, the articles are packed for carbonizing and the usual carbonizing operations are carried out. It will be found that the parts protected by this composition remain quite soft and are not affected by the carbonizing operations.

To prevent the protective composition from sticking, particularly to rough surfaces, such as screw-threads, etc., the surfaces should first be coated with an aqueous suspension of finely ground fireclay, of about the same consistency as that of the mixture. It will be found that if the protective mixture is applied over this fireclay coating, preferably before the latter has had time to dry completely, there will be no difficulty whatever in the removal of the coating after treatment and quenching.

In addition to case-hardening, the compound or mixture described above may be applied in other heat-treating processes, such as for preventing hardening at desired spots or regions in carbon tool steel. In this case there is no anti-carbonizing action but merely a retardation of cooling effect. This may be conveniently effected by coating with the protective composition the surface to be so treated, before reheating for quenching, but in this case without first coating with fireclay paste, when the protective material will adhere to the metal and retard the quenching process, according to the thickness of the coating applied. As the temperatures used with the tool work are lower (about 760-800° C.) than for case-hardening the percentages of sodium silicate may be increased say to about 35% and the borax and sodium carbonate say to about 15%.

The proportions of the constituents of the mixture described above may be varied, but the quantities of borax and/or sodium carbonate should not be sufficiently reduced to give a non-adherent coating, nor a coating which will crack when baked.

What I claim as my invention and desire to secure by Letters Patent is:—

1. The herein described composition of matter for use in protecting articles of iron, steel and the like in the process of heat-treatment, comprising fireclay, a soluble alkaline silicate, and a fluxing agent.

2. The herein described composition of matter for use in protecting articles of iron, steel and the like in the process of heat-treatment, comprising fireclay, a soluble alkaline silicate, an alkaline carbonate and a borate.

3. The herein described composition of matter for use in protecting articles of iron, steel and the like in the process of heat-treatment, comprising fireclay, a soluble alkaline silicate, an alkaline carbonate and an alkaline borate.

4. The herein described composition of matter for use in protecting articles of iron, steel and the like in the process of heat-treatment, comprising fireclay, a fluxing agent and soluble powdered sodium silicate.

5. The herein described composition of matter for use in protecting articles of iron, steel and the like in the process of heat-treatment, comprising fireclay, an alkaline carbonate and a borate, and soluble powdered sodium silicate.

6. The herein described composition of matter for use in protecting articles of iron, steel and the like in the process of heat-treatment, comprising fireclay, an alkaline carbonate and an alkaline borate, and soluble powdered sodium silicate.

7. The herein described composition of matter for use in protecting articles of iron, steel and the like in the process of heat-treatment, comprising fireclay, a fluxing agent and soluble powdered sodium silicate, prepared by evaporating sodium silicate solution to dryness at a temperature not exceeding 300° C., and then grinding the dried product.

8. The herein described composition of matter for use in protecting articles of iron, steel and the like in the process of heat-treatment, comprising fireclay, an alkaline carbonate and a borate and soluble powdered sodium silicate, prepared by evaporating sodium silicate solution to dryness at a temperature not exceeding 300° C., and then grinding the dried product.

9. The herein described composition of matter for use in protecting articles of iron, steel and the like in the process of heat-treatment, comprising fireclay, an alkaline carbonate and an alkaline borate and soluble powdered sodium silicate, prepared by evaporating sodium silicate solution to dryness at a temperature not exceeding 300° C., and then grinding the dried product.

10. The herein described composition of matter for application as a protective coating to articles of iron, steel and the like in the process of heat-treatment, consisting of the following constituents in substantially the following proportions:—

| | |
|---|---|
| Fireclay | 63% |
| Sodium silicate powder | 25% |
| Fused borax | 6% |
| Sodium carbonate | 6% |

11. The herein described composition of matter for application as a protective coating to articles of iron, steel and the like in the process of heat-treatment, consisting in a viscous liquid containing an aqueous solution and suspension of a soluble alkaline silicate, powdered fireclay, and a fluxing agent.

12. The herein described composition of matter for application as a protective coating to articles of iron, steel and the like in the process of heat-treatment, consisting in a viscous liquid containing an aqueous solution and suspension of a soluble alkaline silicate, powdered fireclay, an alkaline carbonate and an alkaline borate.

13. The herein described composition of matter for application as a protective coating to articles of iron, steel and the like in the process of heat-treatment, consisting in a viscous liquid containing an aqueous solution and suspension of a soluble alkaline silicate, powdered fireclay, fused borax and sodium carbonate.

In testimony whereof I affix my signature.

SAMUEL WHYTE.